(12) United States Patent
Takei

(10) Patent No.: US 7,902,986 B2
(45) Date of Patent: Mar. 8, 2011

(54) RFID TAG

(75) Inventor: Ken Takei, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 365 days.

(21) Appl. No.: 12/285,303

(22) Filed: Oct. 1, 2008

(65) Prior Publication Data

US 2009/0091456 A1   Apr. 9, 2009

(30) Foreign Application Priority Data

Oct. 5, 2007  (JP) .................... 2007-262290

(51) Int. Cl.
  *G08B 13/14* (2006.01)
(52) U.S. Cl. .................. 340/572.7; 340/572.1; 257/499; 257/690
(58) Field of Classification Search ............. 340/572.1, 340/572.7, 572.8; 307/104; 257/428, 690, 257/499
See application file for complete search history.

(56) References Cited

U.S. PATENT DOCUMENTS

| 6,700,491 B2 * | 3/2004 | Shafer .............. 340/572.7 |
| 7,298,273 B2 | 11/2007 | Baba | |
| 2006/0214801 A1 | 9/2006 | Murofushi et al. | |
| 2006/0290514 A1 * | 12/2006 | Sakama et al. ....... 340/572.7 |
| 2008/0150725 A1 * | 6/2008 | Takahashi ........... 340/572.7 |
| 2009/0140300 A1 * | 6/2009 | Usami ................. 257/288 |

FOREIGN PATENT DOCUMENTS

| JP | 2000-099673 | 9/1998 |
| JP | 2000-200328 | 10/1998 |
| JP | 2005-347635 | 6/2004 |
| JP | 2006-268090 | 3/2005 |
| JP | 2006-270766 | 3/2005 |

OTHER PUBLICATIONS

Klaus Finkenzellar, "RFID Handbook", May 2004, p. 45.

* cited by examiner

*Primary Examiner* — Toan N Pham
(74) *Attorney, Agent, or Firm* — Stites & Harbison PLLC; Juan Carlos A. Marquez, Esq.

(57) ABSTRACT

An RFID tag of the present invention is provided to suppress variations in the capacity component that occur during physical coupling between an antenna and a semiconductor chip as part of the manufacturing process. The RFID tag includes an antenna with a pair of electric contacts, draw-out conductors of the electric contacts, and an RFID chip with a pair of electric contacts, wherein the electric contacts of the antenna are encompassed to their corresponding electric contacts of the RFID chip, and draw-out electrodes are drawn out in an opposite direction to the facing direction overlapped direction).

20 Claims, 15 Drawing Sheets (a)

(Normal)

(b)

(c)

(Inclined)

(d)

RFID TAG

CLAIM OF PRIORITY

The present application claims priority from Japanese Patent Application 2007-262290 filed on Oct. 5, 2007, the content of which is hereby incorporated by reference into this application.

FIELD OF THE INVENTION

The present invention relates to an RFID tag, more specifically, to the construction of a mobile terminal used for a wireless RF-ID communication system, in which electromagnetic waves that are radiated by a base station are scattered by an unspecified object or a mobile terminal, and arrive at the base station again, while the base station receives the incoming electromagnetic waves and identifies the object—or the mobile terminal-specific information.

BACKGROUND OF THE INVENTION

One of well-known conventional techniques is a direction division duplex (DDD) scheme implemented in systems where scattered waves are used directly as carrier waves. In this technique, a circulator is used to carry out equivalent duplexing of a transmitting wave and a received wave based on differences in directiveness between outgoing electromagnetic waves from a base station and incoming electromagnetic waves to the base station. Further details on this technique are found in RFID Handbook $2^{nd}$ Edition by Klaus Finkenzellar, Translated by Soft Engineering Institute, Industrial Daily Newspaper, May 2004, pp. 45.

In addition, Japanese Patent Application Publication No. 2000-99673 describes how antenna pads are joined to pads of a semiconductor device including an IC chip and an antenna coil.

Japanese Patent Application Publication No. 2006-268090 describes an electrical connecting structure utilizing a tapered or a triangle shape pad for an RFID tag that is provided with an antenna pattern and a circuit chip.

Japanese Patent Application Publication No. 2000-200328 describes arranging a couple of electrodes provided to an IC chip almost at right angles to the length of a base material.

Japanese Patent Application Publication No. 2006-270766 describes preparing a wireless tag having a common dipole antenna length and adjusting the length of the dipole antenna of the wireless tag during its use so that it matches the wavelength of the propagating radio waves.

Lastly, Japanese Patent Application Publication No. 2005-347635 describes a semiconductor device including a semiconductor chip with both-side electric contact for radio communication and an antenna for transmitting and receiving, in which a conductive bump is formed in a region of an analog circuit including a rectification circuit and a clock circuit, except in regions that may possibly cause electrically undesired coupling to the conductive bump.

SUMMARY OF THE INVENTION

Techniques for identifying many and unspecified objects at a remote distance have recently been expected to expand their applicability or utility to keep abreast with an ever growing size of the distribution industry and high speed of distribution. In order to identify such objects being distributed in large quantities and at high speed, it is essential to use an information transfer means that can be permeated into those objects because spatial relations between those plural objects cannot simply be specified. Radio techniques fit for such use, and, in reality, detection of an object using electromagnetic waves and transfer of information about the same object are already being implemented in a wireless tag system for example.

Yet it is a common request from the society heading towards high-speed, large-capacity distribution to achieve enhanced capabilities in object detection and information transfer, in other words, to expand researchable distance (range) of electromagnetic waves of the same system. Since electromagnetic waves are damped in proportion to the square to cube of their travel distance, if the travel distance increases, electromagnetic waves having been radiated from a base station experience a drastic power loss by the time they arrive at the base station again, and exhibit very low resistance due to a number of diverse disturbance factors. To re-radiate electromagnetic waves to the base station with a minimum energy conversion loss of electromagnetic waves, the system customarily uses a scattering electromagnetic wave from a target object to be identified as a carrier wave for the transfer of information. To generate a new carrier wave by a certain means, radio frequency power of an electromagnetic wave needs to be converted into a power supply for the certain means, and a loss of power inevitably occurs for that.

In wireless transmission using electromagnetic waves, the range of the electromagnetic waves is limited by power that is supplied to a carrier wave. Hence, maximizing power efficiency in the production of a carrier wave is led to expanding the range of an electromagnetic wave in the system, in other words, maximizing application limit of the system.

In the conventional technique by Klaus Finkenzellar, because a base station distinguishes a transmitting wave from a received wave based on the fact that electromagnetic waves that pass through the circulator travel in opposite directions and are independent of each other, a radiation field of the electromagnetic wave is used. The radiation field, as compared with two other fields, i.e., induction and near fields, can deliver power to a remote site, so the size of an antenna for transmitting and receiving electromagnetic energy is preferably similar to the wavelength of the electromagnetic energy to be transmitted and received.

As such, a transmit power of the base station undergoes a sort of amplitude modulation by a mobile terminal, and a side-band wave that is newly produced from the amplitude modulation is read by the base station to be used for sensing information which includes whether there is a mobile terminal. Therefore, it is very important to obtain a large degree of amplitude modulation for a mobile terminal so as to extend communication distance between the base station and the mobile terminal. The modulation degree of amplitude modulation can be increased by making big changes in the radio frequency load for an antenna of the mobile terminal. To this end, it is necessary to achieve a sufficiently good impedance matching between the mobile terminal antenna and a radio frequency circuit. If there is a great number of targets for identification, the number of mobile terminals also becomes large, so mass production is possible when specific manufacture of the mobile terminals is taken into consideration and it is necessary to find an antenna and a radio frequency circuit to achieve a good impedance match or a structure for coupling a semiconductor chip the same radio frequency circuit.

In general, a technique for mass producing external antennas and semiconductor chips at high size precision using a printing technique already exists and has been around for a while. However, a method for coupling an external antenna and a semiconductor chip/radio frequency circuit at high size precision has not yet established to date in that printing techniques are not involved or mechanical alignment should be taken.

For example, Japanese Patent Application Publication No. 2000-99673 describes a method of forming a pad portion (bump) of a semiconductor on the periphery of an IC chip provided with an analog circuit or a digital circuit, and then making pads (connecting conductors) of a large-area antenna connected to the semiconductor pad portion (FIG. 1 through FIG. 8), or making a tapered portion (connecting conductor) of a lead terminal of the antenna connected to the semiconductor pad portion (FIG. 16 through FIG. 18). However, these connecting methods do not necessarily guarantee that the connecting conductor will not face the analog circuit or the digital circuit formed within a semiconductor chip. In particular, in regard to the connecting conductor of a semiconductor chip, the entry of the connecting conductor of an antenna at the center of the semiconductor chip where a semiconductor circuit is configured is permitted.

Since an RFID tag, as compared with a semiconductor chip, is typically larger for an antenna, mechanical alignment on the basis of a minimum antenna size is utilized. In order to meet an increasing need of high performance or cost reduction of RFID tag, however, circuit integration level within a semiconductor chip would increase even more in the time to come. In that case, the connecting method focused on an antenna makes it more difficult to avoid the occurrence of a problem where the connecting conductor of the antenna is opposite to the analog circuit or the digital circuit within the semiconductor chip, thereby making the problem worse or more serious.

The connecting structure disclosed in the patent documents 2 through 4 also has the same configuration with that of Japanese Patent Application Publication No. 2000-99673, and thus shows the same problem.

Because an antenna and a semiconductor chip/radio frequency circuit cannot be coupled at high size precision, a problem arises that a sufficiently good impedance match between the antenna and the semiconductor chip/radio frequency circuit cannot be achieved at high yield of mass-production.

Moreover, because a semiconductor chip is formed as a laminate structure over a doped semiconductor having a ground potential that has been formed on an intrinsic semiconductor, a circuit which is formed on the semiconductor chip is usually an unbalanced circuit. Also, electromagnetic waves that reach RFID after travelling through free space are in balanced state. Therefore, to more efficiently guide electromagnetic energy existing in free space to the radio frequency circuit formed on the semiconductor chip, a structure for achieving balance-unbalance conversion must be provided somewhere. Otherwise, balance-unbalance missmatching would consequently make it difficult to achieve high-efficiency power transmission between the antenna and the semiconductor chip/radio frequency circuit.

Japanese Patent Application Publication No. 2006-268090, as noted before, describes a structure for achieving a connection to provide a good impedance matching state between an external antenna and an RFID chip. However, it gives no regard to the disturbance of balance-unbalance missmatching in achieving high-efficiency power transmission between the external antenna and the RFID chip.

Meanwhile, Japanese Patent Application Publication No. 2005-347635 suggests that a conductive bump functioning as an antenna coupling conductor should be formed on both sides of the semi-conductor chip with both-side electric contact so that the antenna does not need to face the analog circuit of the semiconductor chip. By the use of the configuration of Japanese Patent Application Publication No. 2005-347635, the coupling conductor that corresponds to ground plane of the unbalanced chip circuit has a larger area.

It is, therefore, an object of the present invention to provide a novel RFID tag for achieving a sufficiently good impedance matching state between an antenna and a semiconductor chip/radio frequency circuit at high yield of mass-production even in the mass production phase where a very high precision mechanical alignment is not really expected.

Another object of the present invention is to provide a novel RFID tag suitable for an RFID system, which is capable of achieving a good impedance matching state between an antenna and a semiconductor chip/radio frequency circuit, in other words, substantially extending distance between a base station and a mobile terminal.

Further, it is still another object of the present invention to provide an RFID tag which enables a high-yield production of mobile terminals with maintained good performances despite a large number of mobile terminals to be produced.

One of typical aspects of the present invention provides an RFID tag, comprising: an RFID chip; and an external antenna, wherein the external antenna includes a pair of electric contacts and a draw-out conductor for each of the electric contacts, wherein the RFID chip includes a pair of electric contacts, and wherein a planar shape of each of the electric contacts of the external antenna is encompassed by the planar shape of each of the electric contacts of the RFID chip, and wherein, with respect to a direction orthogonal to draw-out directions of the draw-out conductors of the antenna, widths of the draw-out conductors are smaller than sizes of the electric contacts of the antenna.

According to the present invention, it is possible to suppress variations in the capacity component that occur at the time of physical coupling between an antenna and a semiconductor chip as part of the manufacturing process, and RFID tags can be mass produced at high yield.

DETAILED DESCRIPTION OF THE PREFERRED EMBODIMENTS

Figure 1:
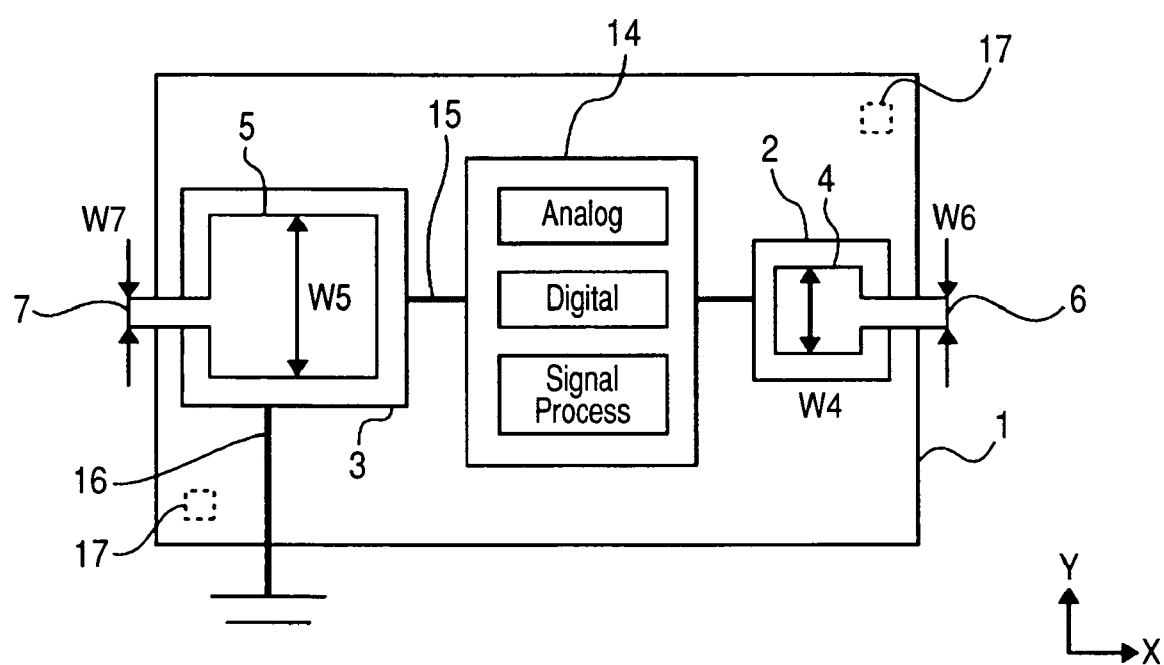
FIG. 1 is a plan view showing a configuration example for an RFID tag in accordance with one embodiment of the present invention.

According to one exemplary embodiment of the present invention, an RFID tag includes an RFID chip and an external antenna, the external antenna including a pair of electric contacts and a draw-out conductor for each of the electric contacts, the RFID chip including a pair of electric contacts, in which the planar shape of each of the electric contacts of the external antenna is encompassed by the planar shape of each of the electric contacts of the RFID chip, and the width of the draw-out conductor is smaller than the size of the electric contact of the antenna, with respect to a direction orthogonal to the draw-out direction of the draw-out conductors of the antenna. Hence, it becomes possible to enhance the yield of mass-production of RFID tags and to suppress variations in the capacity component that occur at the time of physical coupling between an antenna and a semiconductor chip as part of the manufacturing process.

Note that the manufacturing process does not necessarily guarantee high precision mechanical alignment, but this can be solved by employing an electrical coupling structure that is affected as little as possible by the alignment precision. For spatial diffusion of an electromagnetic field in a radio frequency region, electrical coupling occurs, due to the electromagnetic coupling, even between conductors that are originally undesired although a direct mechanical connection has not been made. This requires a special coupling structure between an antenna and a semiconductor chip/radio frequency circuit which can eliminate the unnecessary electromagnetic coupling as much as possible. There are three individual components of an electromagnetic field: a radiation field, an induction field, and an electrostatic field. For a short distance communication, the electrostatic field plays an active role. Therefore, it is only necessary to design a coupling structure that can avoid unnecessary electrical coupling due to the electrostatic field as much as possible. Since the near field is coupled by a condenser, any region in which conductors planar in shape face each other (or overlapped), except for a region originally required, must be eliminated as much as possible so as to accomplish the objects of the present invention.

If the precise alignment of an antenna and a semiconductor chip is something that cannot be expected, it is one option to develop a connecting structure to overcome position match error between the antenna and the semiconductor chip. For coupling between an antenna and a semiconductor chip, a junction electrode may be formed on each and the thusly formed junction electrodes may be electrically coupled to each other by means of an intermediate conductor such as a bump. In effect, this connecting scheme is broadly used for RFID tags because it is low in manufacturing costs and suitable for mass production. Normally, a plurality of circuits are integrated on a semiconductor chip, so if the electric contacts of an antenna outreach the plane of the electric contacts of a semiconductor chip, the electric contacts of the antenna are likely to overlap the circuit(s) on the semiconductor chip. As such, in a planar shape, the electric contacts of a semiconductor chip should have a larger area than the electric contacts of an antenna to make the electric contacts of the antenna positioned within the plane of the electric contacts of the semiconductor chip.

Meanwhile, capacity is formed between electric contacts of the antenna and the semiconductor chip. In order to suppress the capacity component for one reason, each electric contact of the antenna should be provided with a draw-out conductor having a width smaller than the size of the electric contact, and the electric contacts of the antenna should be electrically coupled to the antenna main body. The narrow conductor line is inductive and dependent upon capacity from the electric contacts, so it can cancel out the capacity component formed between the electric contacts.

As noted before, since it is hard to obtain a sufficiently good precision in alignment of an antenna and a semiconductor chip, the overlapping area between the draw-out conductor and the electric contacts of the semiconductor chip varies depending on an error of the alignment. Suppose that a draw-out electrode is drawn out in a direction opposite to the draw-out direction. Here, if one of the two draw-out conductors increases its overlapping area with the electric contacts of the semiconductor chip, the other would have a reduced overlapping area with the electric contacts of the semiconductor. Overall, the capacity component by the draw-out conductors that are loaded in series on the antenna stays unchanged and is not much affected by the alignment precision of the antenna and the semiconductor chip, so electric coupling between the antenna and the semiconductor is achieved.

According to another exemplary embodiment of the present invention, an RFID tag includes an RFID chip provided with an analog circuit and a digital circuit, and an external antenna provided with a pair of electric contacts and a draw-out conductor for each of the electric contacts, in which the draw-out conductors of the external antenna do not face (or do not overlap with) at least one of the analog and digital circuits on the side orthogonal to the planar shape.

Because of the limitations on the circuit layout in a semiconductor chip, the draw-out conductors of the antenna may not be drawn outside the chip without facing any of the circuits formed in the semiconductor chip. In the case where a semiconductor chip is provided with both the analog and digital circuits, the draw-out conductors are allowed to pass above the digital circuit. Generally, a digital circuit, as compared with an analog circuit, has high operation impedance. Thus, a high-impedance transmission line that configures a circuit has a narrow width, and capacity formed by its being opposite to the draw-out conductors can be made even lower than that of the analog circuit having lower operation impedance. Among other analog circuits, a power supply circuit usually has the lowest operation impedance. Therefore, when passing above analog circuits, the draw-out electrodes need to avoid passing above the power supply circuit.

Because a semiconductor chip is formed as a laminate structure over a doped semiconductor having a ground potential that has been formed on an intrinsic semiconductor, a circuit which is formed on the semiconductor chip is usually an unbalanced circuit. Also, electromagnetic waves that reach an RFID after traveling through free space are in balanced state. Therefore, to more efficiently guide electromagnetic energy existing in free space to the radio frequency circuit formed on the semiconductor chip, a structure for achieving balance-unbalance conversion must be provided somewhere. Otherwise, balance-unbalance miss-matching would consequently make it difficult to achieve high-efficiency power transmission between the antenna and the semiconductor chip/radio frequency circuit. This problem is resolved by making a balance-unbalance conversion structure inside the external antenna, or by installing a planar type high-density mounting radio frequency circuit, apart from the semiconductor chip, and making the same balance-unbalance conversion structure inside the high-density mounting radio frequency circuit.

According to yet another exemplary embodiment of the present invention, an RFID tag includes an RFID chip provided with an analog circuit and a digital circuit, in which the digital circuit is disposed near an electric contact connected to the earth potential of the RFID chip.

Among the circuits, the electric contact connected to the earth potential of the semiconductor chip shows the most stable reference potential. In addition, compared with the analog circuit, the digital circuit, which usually handles a time series, pulse signal, generates more unnecessary signals (noise) on the frequency axis. Thus, it is desirable to install the digital circuit near the electric contact connected to the earth potential of the semiconductor chip and shows the most stable reference potential.

Embodiment 1

With reference to FIG. 1 through FIG. 4, the following will now explain one embodiment of the present invention. FIG. 1 is a plan view showing a configuration example for an RFID tag in accordance with one embodiment of the present invention. On a rectangular semiconductor chip (RFID chip) 1, an electrode 2 for hot contact that is not connected to the earth potential of a semiconductor chip, an electrode 3 for earth contact that is connected to the earth potential of the semiconductor chip, an electrode 4 for hot contact of an antenna, an electrode 5 for earth contact of the antenna, a hot draw-out conductor 6 of the antenna, and an earth draw-out conductor 7 of the antenna are formed. The planar shape of each of the electric contacts 4 and 5 of the external antenna is encompassed by the planar shape of each of the electric contacts 2 and 3 of the semiconductor chip. That is to say, the size of the rectangular electric contact 4 is smaller than the plane of the rectangular electric contact 2, and the size of the rectangular electric contact 5 is smaller than the plane of the rectangular electric contact 3. In this state where the planar shape of the electric contacts of the external antenna is encompassed by the planar shape of the electric contacts of the semiconductor chip, the electric contacts 5 and 6 of the external antenna make electrical connection onto the electric contacts 2 and 3, respectively. To be more specific, in X-Y plane of FIG. 1, the area of the electrodes of the semiconductor chip is substantially larger than the area of the electrodes of the external antenna, having the electrodes of the external antenna located within the plane of the electrodes of the semiconductor chip, and both sides of the electric contacts 2 and 4 face the electric contacts 3 and 5 with respect to Z-axis normal to the X-Y plane. Moreover, in this embodiment, the electric contacts 2 and 4 and the electric contacts 3 and 5 are similar to each other in their shape, i.e., each having a rectangular shape.

The width of the draw-out conductors 6 and 7 of the antenna in the Y direction is smaller than the width of the electric contacts 4 and 5 of the antenna. That is, the width W6 of the hot draw-out conductor 6 of the antenna in the Y direction is smaller than the size (side length W4) of the electric contact 4, and the width W7 of the earth draw-out conductor 7 of the antenna in the Y direction is smaller than the size (side length W5) of the electric contact 5. Further, those two draw-out conductors 6 and 7 are drawn out, facing the opposite direction, i.e., in opposite directions from each other in the X direction of FIG. 1. Reference numeral 14 indicates a radio frequency circuit of an RFID tag, which is connected to the electric contacts 2 and 3 through the conductor 15 (15*a*, 15*b*). The electric contact 3 is connected to the earth through the conductor 16. Reference numeral 17 indicates a positioning marker for each member mounted on the semiconductor chip 1.

Figure 2:
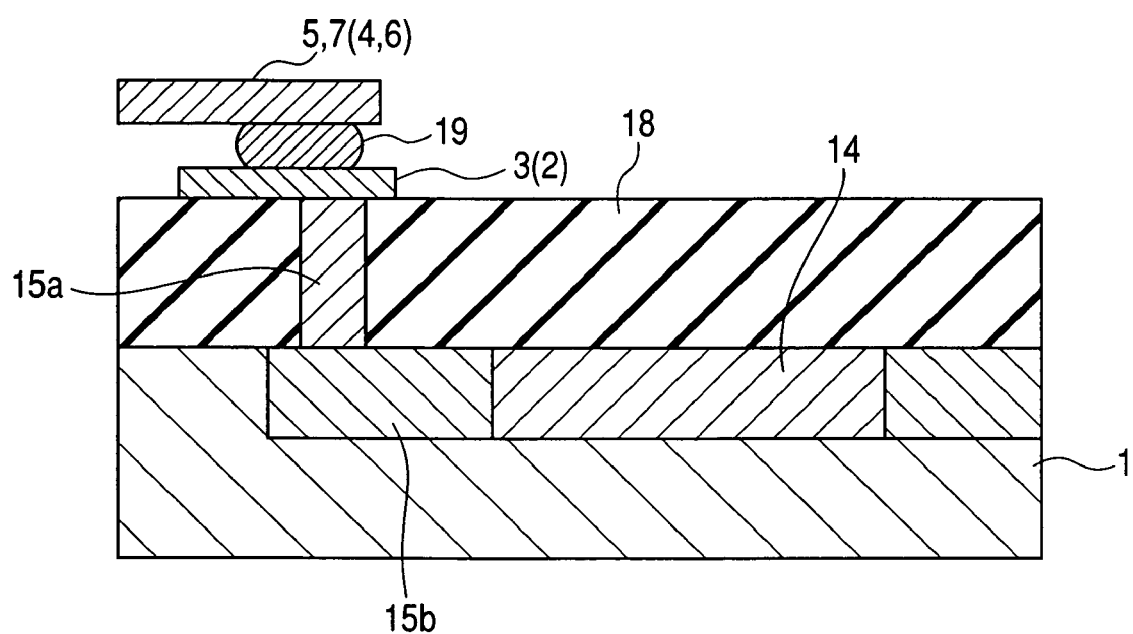
FIG. 2 is a cross-sectional view conceptually showing the vertical section of a main part of the RFID tag in FIG. 1.

FIG. 2 is a cross-sectional view conceptually showing the vertical section of a main part of the RFID tag in FIG. 1. The conductors 15*a* and 15*b* are formed in a through hole that is provided to a dielectric substrate 18 and others. The electric contacts 2 and 3 of the RFID chip are electrically connected to the electric contacts 4 and 5 of the antenna in a bump structure 19.

Figure 3:
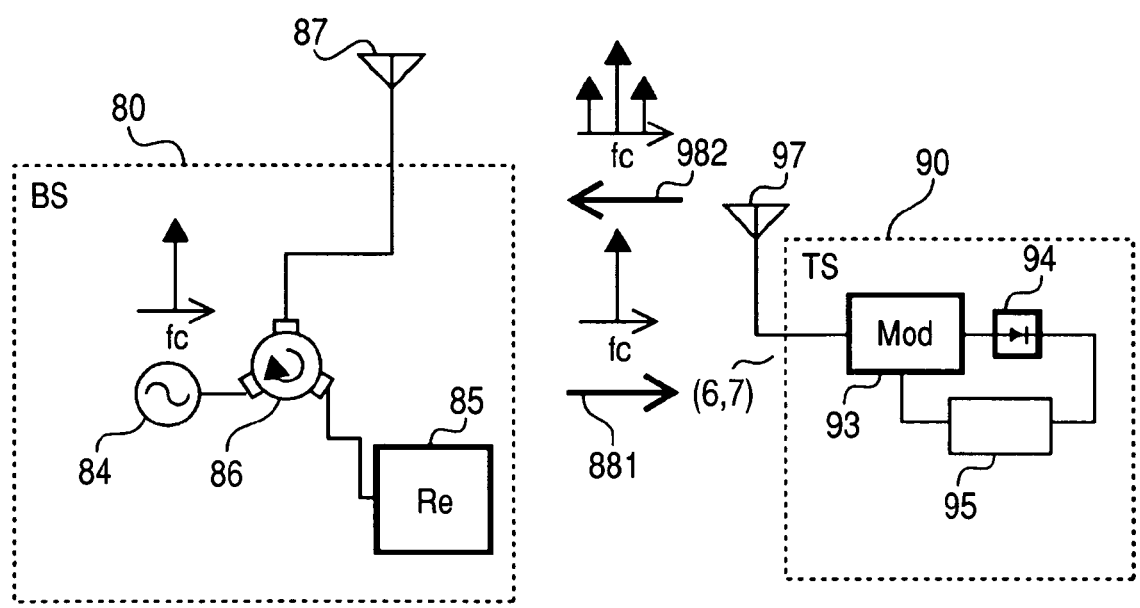
FIG. 3 is a schematic view of an RFID system using the RFID tag in FIG. 1.

FIG. 3 is a schematic view of an RFID system using the RFID tag in FIG. 1. Reference numeral 80 indicates a base station, and reference numeral 90 indicates a mobile terminal, i.e., an RFID tag. An antenna 97 of the mobile terminal is connected to a modulation circuit 93, a rectifying circuit 94, and a signal processing circuit (MPU) 95 of the semiconductor chip 1, via two draw-out conductors 6 and 7.

Meanwhile, an output from a carrier wave generator 84 which serves as a source of electromagnetic waves radiated from the base station 80 is radiated from an antenna 87 through a circulator 86. When an electromagnetic wave 881 radiated from the base station 80 arrives at the mobile terminal, electromagnetic energy is introduced or captured by the antenna 97 of the mobile terminal and converted into a DC power supply at the rectifying circuit 94. Then, the modulation circuit 93 and the MPU 95 execute modulation on a load impedance of the antenna 97 using the DC power supply, and the re-arrived incident electromagnetic wave is guided as an amplitude-modulated reflecting wave 982 to the circulator 86 form the antenna 87. By the non-reciprocal nature of the circulator, the electromagnetic wave is delivered to a receiving circuit 85, not the carrier wave generator 84. Now that the base station 80 distinguishes a transmitting wave from a received wave based on the fact that electromagnetic waves that pass through the circulator 86 travel in opposite directions and are independent of each other, a radiation field of the electromagnetic wave is used. Unlike the other two fields such as the induction field and the near field (electrostatic field), the radiation field can deliver power to a remote place.

The antenna 97 and the semiconductor chip 1 are electrically coupled by an external electric contact, and electromagnetic energy that is captured by the antenna 97 from external space through the draw-out electrode is supplied to the semiconductor chip 1.

As such, a transmit power from the base station 80 undergoes a sort of amplitude modulation by the mobile terminal 90, and a side-band wave that is newly produced from the amplitude modulation is read by the base station 80 to be used for sensing information which includes whether there is a mobile terminal. Therefore, it is very important to obtain a large degree of amplitude modulation for a mobile terminal so as to extend communication distance between the base station and the mobile terminal. The degree of amplitude modulation can be increased by making big changes in the radio frequency load for the antenna 97 of the mobile terminal. To this end, it is necessary to achieve a sufficiently good impedance match between the mobile terminal antenna 97 and the radio frequency circuit.

In accordance with this embodiment, the connecting conductors 4 and 5 of the antenna are encompassed, in terms of area, by the connecting conductors 2 and 3 of the semiconductor chip. Mounting the connecting conductors 4 and 5 of the antenna on the semiconductor chip 1 can be done simply yet precisely by positioning each member with the help of the positioning marker 17. Even if there may be an alignment error in coupling the antenna and the semiconductor chip, an effective facing area between the electric contacts of the antenna and the electric contacts of the semiconductor chip stays the same. Besides, since the connecting conductors 4 and 5 of the antenna are encompassed, in terms of area, by the connecting conductors 2 and 3 of the semiconductor chip, the electric contacts 4 and 5 of the antenna do not outreach the plane of the electric contacts of the semiconductor chip. Consequently, it becomes possible to suppress variations in the capacity component due to the alignment error at the time of coupling between the antenna and the semiconductor chip as part of the manufacturing process.

Figure 4:
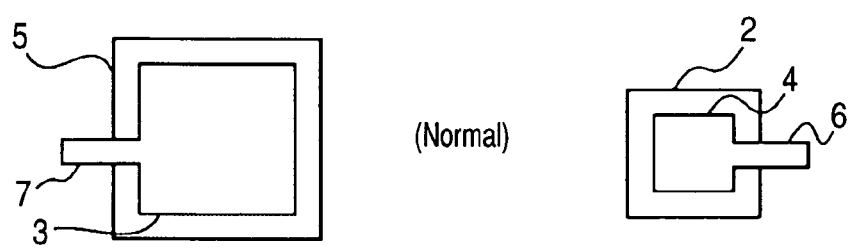
FIG. 4 is an explanatory view explaining functions and effects of the RFID tag in FIG. 1.
Figure 4:
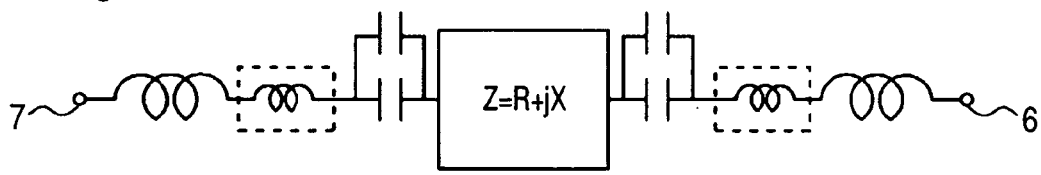
Figure 4:
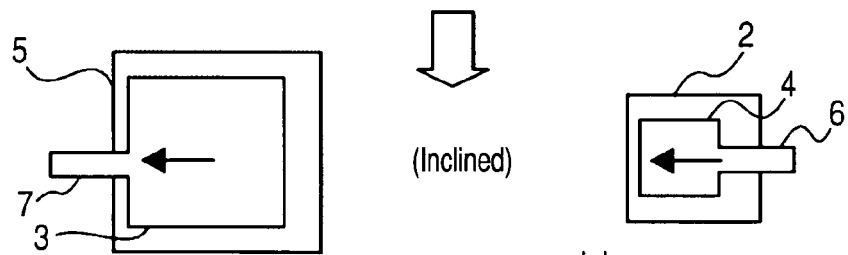
Figure 4:
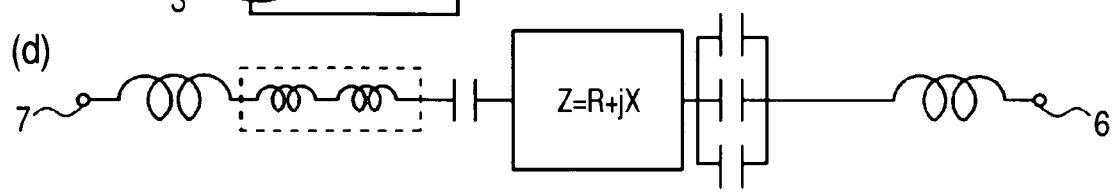
Figure 5:
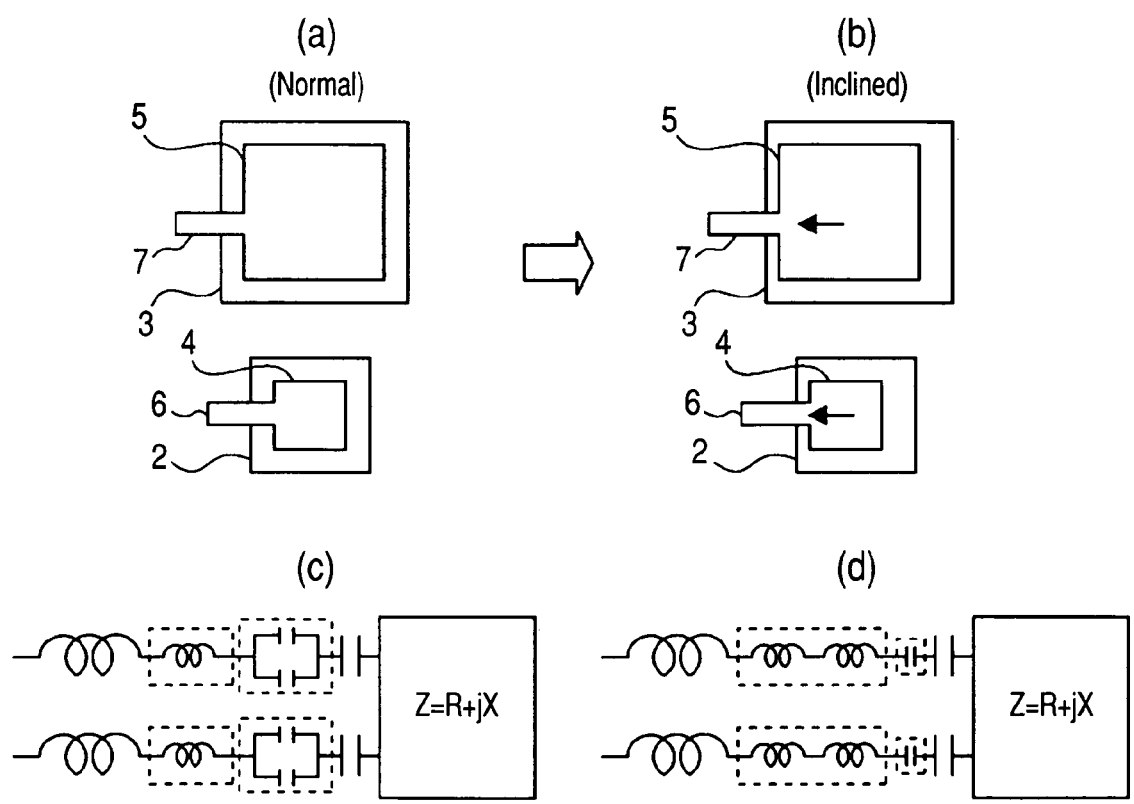
FIG. 5 is an explanatory view explaining an RFID tag as a comparative example of the RFID tag in FIG. 1.

In this regard, FIG. 4 and FIG. 5 provide further explanation. FIG. 4 corresponds to the RFID tag of this embodiment, and the electric contacts 2 and 4 and the electric contacts 3 and 5 in normal state shown in FIG. 4(*a*) are also depicted in FIG. 1. In this state, as shown in FIG. 4(*b*), there is little difference in the capacity of a draw-out conductor and an electric contact of the semiconductor chip and the inductance load amount of the draw-out conductor itself upon the antenna between the draw-out conductor 6 and the draw-out conductor 7. As shown in FIG. 4(*c*), however, if electric contacts are inclinedly (or deflectively) connected to the left overall due to the alignment error, the draw-out electrodes are drawn out, facing the opposite directions, such that capacity C decreases but inductance L increases at the draw-out conductor 3. On the contrary, inductance L decreases but capacity C increases at the draw-out conductor 4. Thus, L and C between the draw-out conductor 6 and the draw-out conductor 7 remain substantially constant. Accordingly, variations due to the alignment error, i.e., variations in capacity of the draw-out conductors and the electric contacts of the semiconductor chip as well as variations in inductance load amount of the draw-out conductor itself upon the antenna can be suppressed.

FIG. 5 shows a comparative example of RFID tag, draw-out electrodes of which are drawn out in the same direction as shown in FIG. 5(*a*). In this state, as shown in FIG. 5(*b*), there is little difference in the capacity of a draw-out conductor and an electric contact of the semiconductor chip and the inductance load amount of the draw-out conductor itself upon the antenna between the draw-out conductor 3 and the draw-out conductor 4. As shown in FIG. 5(*c*), however, if electric contacts are inclinedly (or deflectively) connected to the left to overall due to the alignment error, the draw-out electrodes are drawn out in the same direction, such that capacity C decreases but inductance L increases at the both draw-out conductors. That is, L and C between the draw-out conductor 6 and the draw-out conductor 7 vary. Accordingly, when draw-out electrodes are drawn out in the same direction, variations in capacity and inductance due to the alignment error cannot be suppressed.

As discussed above, in accordance with this embodiment, variations in the capacity component that occur at the time of physical coupling between an antenna and a semiconductor chip as part of the manufacturing process can be suppressed, so RFID tags can be mass produced at high yield. In result, electromagnetic energy can be delivered from the antenna to the circuits in the semiconductor chip at high efficiency, giving rise to reduction in the cost of RFID tags and the power consumption, i.e., extension in an RFID tag communication distance.

Embodiment 2

Figure 6:
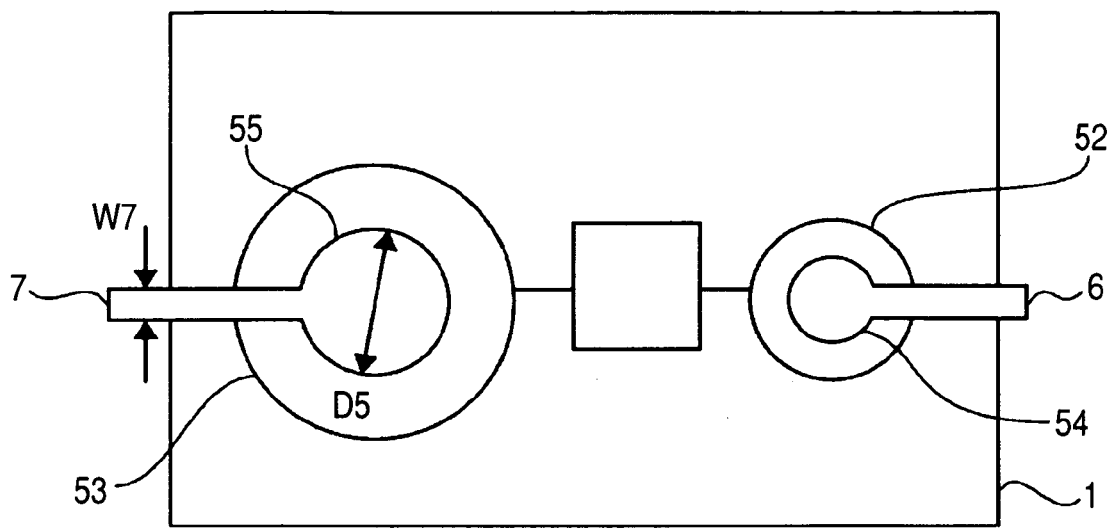
FIG. 6 is a plan view showing the configuration of an RFID tag in accordance with another embodiment of the present invention.

Another embodiment of the present invention will now be explained with reference to FIG. 6. FIG. 6 is a plan view showing the configuration of an RFID tag in accordance with another embodiment of the present invention. The RFID tag of this embodiment differs from the embodiment of FIG. 1 in that connecting conductors are all circular. That is, an electrode 52 for hot contact that is not connected to the earth potential of a semiconductor chip, an earth contact electrode 53 that is connected to the earth potential of the semiconductor chip, an electrode 54 for hot contact of an antenna, and an earth contact electrode 55 of the antenna all have a circular-planar shape. The width W7 of an earth draw-out conductor 7 of the antenna in the Y direction is smaller than the size (diameter D5 of circle) of an electric contact 5. Similarly, the width of a hot draw-out conductor 6 of the antenna in the Y direction is smaller than the size of an electric contact 4.

In addition to the effects achieved by the embodiment of FIG. 1, this embodiment can uniformly disperse the tension on a solder bump 19 which is used for interconnecting the connecting conductors to improve the connecting precision between the bump and the connecting conductors.

Embodiment 3

Figure 7:
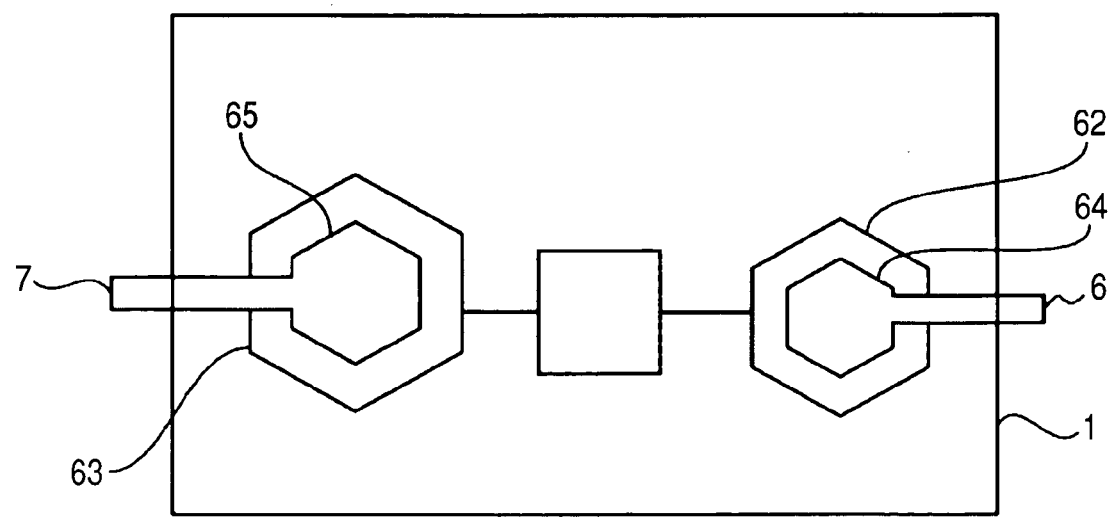
FIG. 7 is a plan view showing the configuration of an RFID tag in accordance with yet another embodiment of the present invention.

Yet another embodiment of the present invention will now be explained with reference to FIG. 7. FIG. 7 is a plan view showing the configuration of an RFID tag in accordance with yet another embodiment of the present invention. The RFID tag of this embodiment differs from the embodiment of FIG. 1 in that all connecting conductors have a hexagonal shape, one of polygons. That is, an electrode 62 for hot contact that is not connected to the earth potential of a semiconductor chip, an earth contact electrode 63 that is connected to the earth potential of the semiconductor chip, an electrode 64 for hot contact of an antenna, and an earth contact electrode 65 of the antenna all have a hexagonal-planar shape. The width of a hot draw-out conductor 64 of the antenna in the Y direction is smaller than the size (width in X and Y directions) of the electric contact 62. Similarly, the width of earth draw-out electrode 65 of the antenna is smaller than the size of the electric contact 63.

As compared with the embodiment in FIG. 1, this embodiment can uniformly disperse the tension on a solder bump 19 which is used for interconnecting the connecting conductors. Although its improvement rate in the connecting precision between the bump and the interconnecting conductors is slightly lower than that of the embodiment in FIG. 6, since the outer shape of the electric contact is linear, it is effective for simplifying the generation of electrode patterns using digital techniques.

In addition, although the electric contact pair 2 and 4 and the electric contacts 3 and 5 in each embodiment are given with similar shapes, the present invention is not limited thereto. For example, as long as the planar shape of the electric contacts of the external antenna can fit within the planar shape of the electric contacts of the RFID chip, the electric contacts 2 and 3 of the RFID chip may have a square shape while the electric contacts 4 and 5 of the external antenna may have a hexagonal shape.

Embodiment 4

Figure 8:
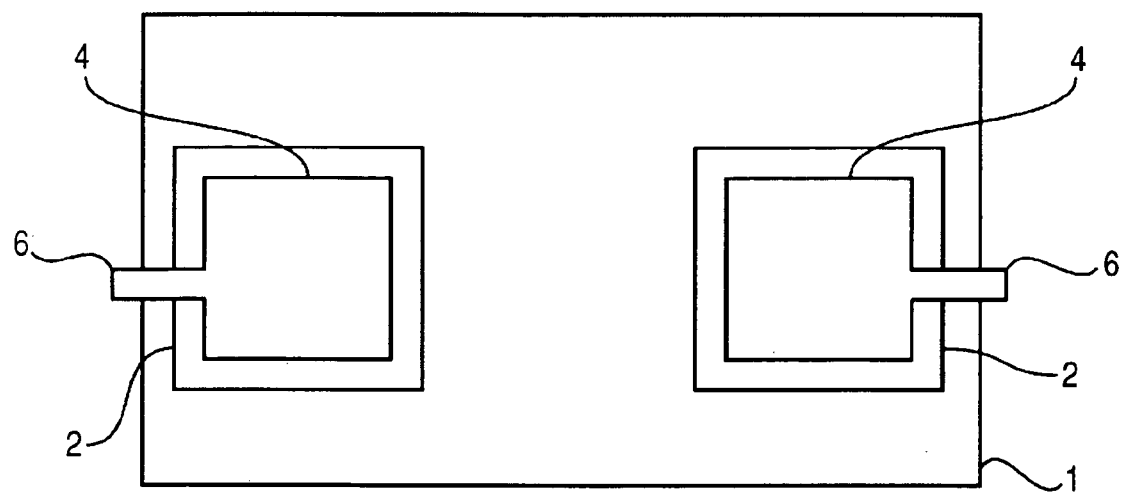
FIG. 8 is a plan view showing the configuration of an RFID tag in accordance with yet another embodiment of the present invention.

Yet another embodiment of the present invention will now be explained with reference to FIG. 8. FIG. 8 is a plan view showing the configuration of an RFID tag in accordance with yet another embodiment of the present invention. The RFID tag of this embodiment differs from the embodiment of FIG. 1 in that it is provided with an electrode 2 for hot contact that is not connected to the earth potential of a semiconductor chip, an antenna electrode 4 for hot contact, and an antenna conductor 6 for hot draw-out (RFID tag circuit part is omitted), instead of the electrode 3 for earth contact that is connected to the earth potential of a semiconductor chip, the electrode 5 for earth contact of the antenna, and the earth draw-out conductor 7 of the antenna. Besides the effects achieved by the embodiment in FIG. 1, this embodiment can also stabilize operations in circuits of the antenna and the semiconductor chip, especially when circuits that are coupled to electric contacts of the antenna and the semiconductor chip are planar. This function becomes even more advantages when a high-performance, planar semiconductor chip is concerned.

Embodiment 5

Figure 9:
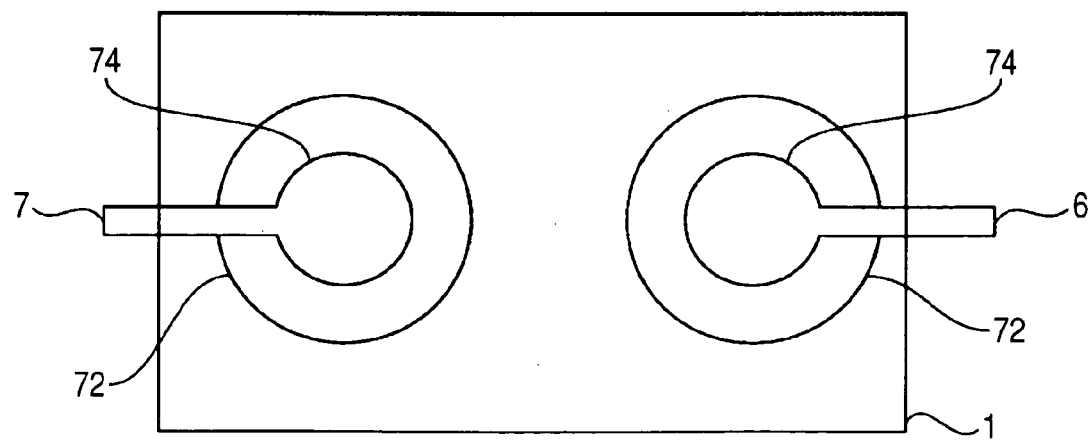
FIG. 9 is a plan view showing the configuration of an RFID tag in accordance with yet another embodiment of the present invention.

Yet another embodiment of the present invention will now be explained with reference to FIG. 9. FIG. 9 is a plan view showing the configuration of an RFID tag in accordance with yet another embodiment of the present invention. The RFID tag of this embodiment differs from the embodiment of FIG. 8 in that connecting conductors are constituted by a circular electrode 72 for hot contact that is not connected to the earth potential of a semiconductor chip, and a circular electrode 74 for hot contact of an antenna.

In addition to the effects achieved by the embodiment of FIG. 8, this embodiment can uniformly disperse the tension on a solder bump 19 which is used for interconnecting the connecting conductors to improve the connecting precision between the bump and the connecting conductors.

Embodiment 6

Figure 10:
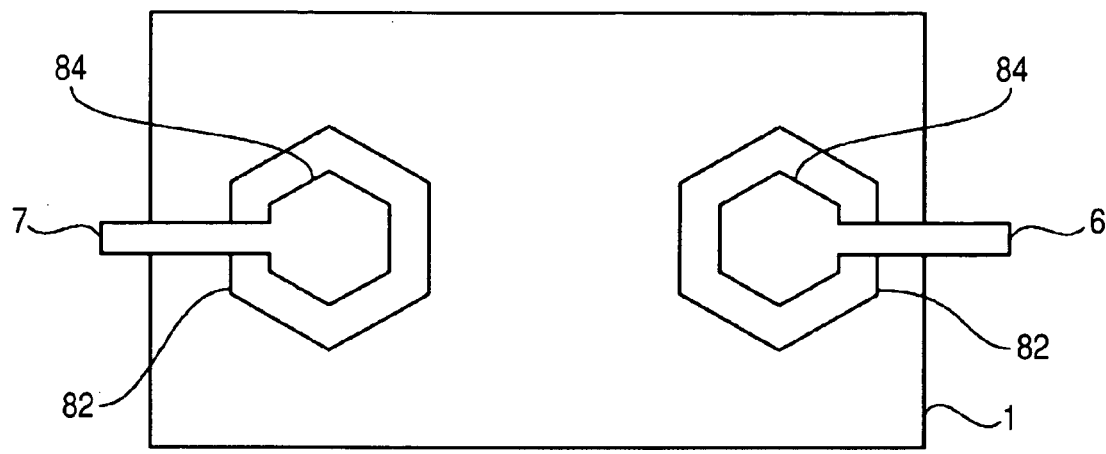
FIG. 10 is a plan view showing the configuration of an RFID tag in accordance with yet another embodiment of the present invention.

Yet another embodiment of the present invention will now be explained with reference to FIG. 10. FIG. 10 is a plan view showing the configuration of an RFID tag in accordance with yet another embodiment of the present invention. The RFID tag of this embodiment differs from the embodiment of FIG. 1 in that in that connecting conductors are constituted by a hexagonal (one of polygons) electrode 82 for hot contact that is not connected to the earth potential of a semiconductor chip, and a hexagonal electrode 84 for hot contact of an antenna.

As compared with the embodiment in FIG. 8, this embodiment can uniformly disperse the tension on a solder bump 19 which is used for interconnecting the connecting conductors. Although its improvement rate in the connecting precision between the bump and the interconnecting conductors is slightly lower than that of the embodiment in FIG. 9, since the outer shape of the electric contact is linear, it is effective for simplifying the generation of electrode patterns using digital techniques.

Embodiment 7

Figure 11:
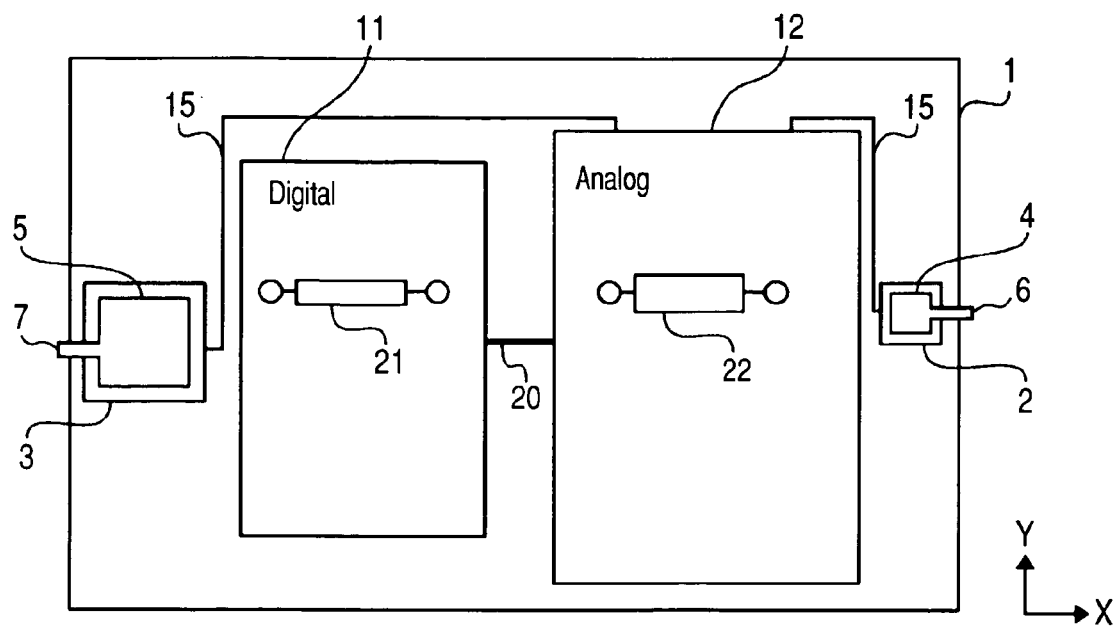
FIG. 11 is a plan view showing the configuration of an RFID tag in accordance with yet another embodiment of the present invention.

Yet another embodiment of the present invention will now be explained with reference to FIG. 11. FIG. 11 is a plan view showing the configuration of an RFID tag in accordance with yet another embodiment of the present invention. A semiconductor chip 1 is provided with a digital circuit 11 and an analog circuit 12 (to be more specific, a modulation circuit and a demodulation circuit between them). The digital circuit 11 and the analog circuit 12 are electrically interconnected by a conductor 20. The digital circuit 11 including a memory or a signal processing circuit uses a transmission line 21 as a wiring element of the circuit, and the analog circuit 12 including a power supply, a rectifier, and an amplifier uses a transmission line 22 as a wiring element of the circuit. The digital circuit 11 on the semiconductor chip 1 is arranged in the vicinity of an electric contact 3 that is connected to the earth potential of an RFID chip, wile the analog circuit 12 is arranged in the vicinity of an electric contact 2 distant from the electric contact 3 connected to the earth potential. In addition, each of the transmission line 21 and the transmission line 22 is composed of a plurality of lines, and needless to say, its direction is not limited to X direction. The analog circuit 12 is connected to draw-out conductors 6 and 7 through a conductor 15.

The relationships of the planar area size between the electric contacts 2 and 4 and between the electric contacts 3 and 5 are the same as ones in the embodiment of FIG. 1. Those two draw-out conductors 6 and 7 are drawn out, facing the opposite direction, i.e., in opposite directions from each other in the X direction of FIG. 11. In terms of the plane of the semiconductor chip 1, the draw-out conductors 6 and 7 are installed at both ends of the semiconductor chip 1. In other words, the draw-out conductors 6 and 7 on the XY plane are formed at positions that do not overlap with the digital circuit 11 and the analog circuit 12 in the Z direction.

Because the draw-out conductors 6 and 7 in this embodiment do not face (overlap) the circuit element in the semiconductor chip, the effects achieved by the embodiment in FIG. 1 are retained during the operation of the semiconductor chip.

Embodiment 8

Figure 12:
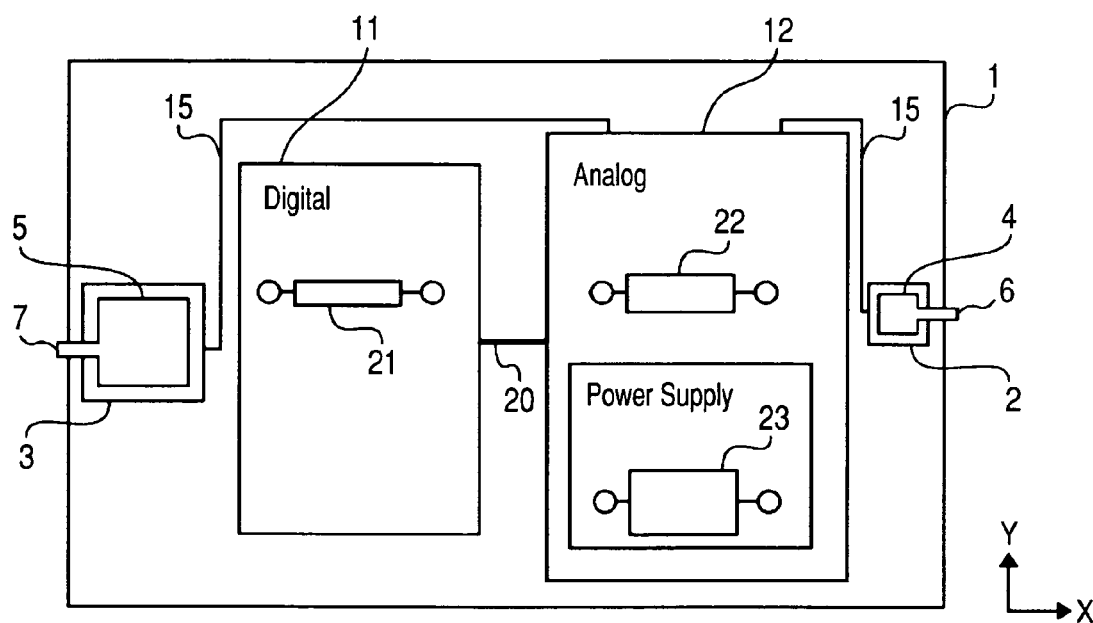
FIG. 12 is a plan view showing the configuration of an RFID tag in accordance with yet another embodiment of the present invention.

Yet another embodiment of the present invention will now be explained with reference to FIG. 12. FIG. 12 is a plan view showing the configuration of an RFID tag in accordance with yet another embodiment of the present invention. A semiconductor chip 1 is provided with a digital circuit 11 and an analog circuit 12. The digital circuit 11 including a memory or a signal processing circuit uses a transmission line 21 as a wiring element of the circuit. This embodiment differs from the embodiment in FIG. 11 in that the analog circuit 12 is provided with a transmission line 22 for a rectifier or an amplifier, and a transmission line 23 for a power supply circuit, using both lines as a wiring element of the circuit. The power supply circuit of the analog circuit 12 is arranged in the vicinity of an electric contact 2, distant from an electric contact 3 that is connected to the earth potential of the semiconductor chip 1. This embodiment provides the same effects as the embodiment of FIG. 11.

Embodiment 9

Figure 13:
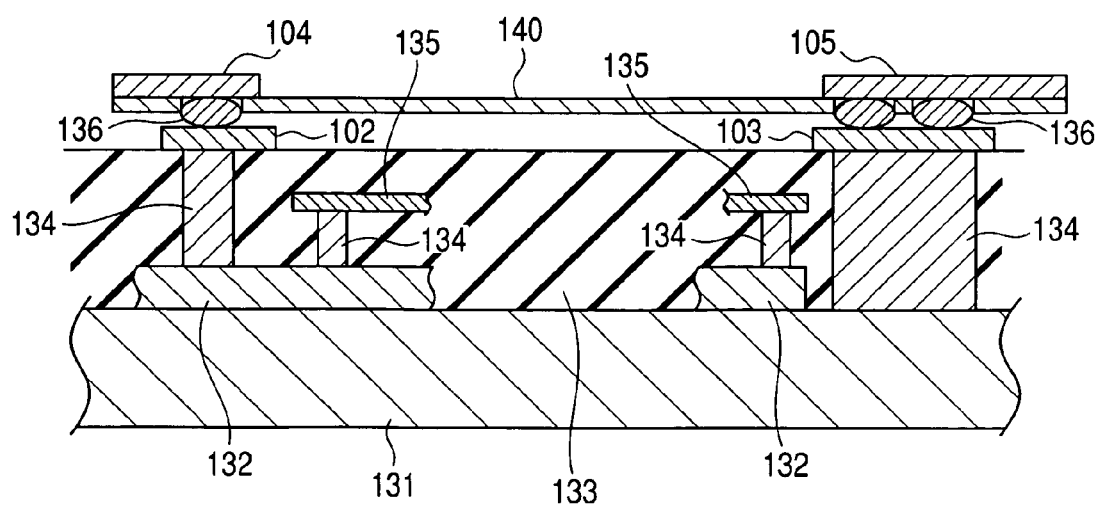
FIG. 13 is a vertical cross-sectional view showing the configuration of an RFID tag in accordance with yet another embodiment of the present invention.

Yet another embodiment of the present invention will now be explained with reference to FIG. 13. FIG. 13 is a vertical cross-sectional view showing more detailed configuration than the RFID tag depicted in FIG. 12. As shown in the drawing, there is a first semiconductor layer 131 at earth potential, and a second semiconductor layer 132 having an active region where a semiconductor device, a passive element, and a wiring element are formed is provided over the first semiconductor layer 131. Also, there is a dielectric support layer 133 which has draw-out structures 134 inside for coupling the first and second semiconductor layers to an external electrode. In this way, an internal line of circuit 135 and external line of circuits 102 and 103 are coupled to the first and second semiconductor layers 131 and 132. More specifically, the line of circuits 102 and 103 correspond to a hot contact conductor and an earth contact conductor of a semiconductor chip.

As such, the earth contact conductor 103 of the semiconductor chip is coupled, via one draw-out structure 134, to the first semiconductor layer 131 at the earth potential, while the hot contact conductor 102 of the semiconductor chip is coupled, via another draw-out structure 134, to the second semiconductor layer 132. The conductors 102 and 103 (these are also connecting conductors) are in an electrical contact with a hot contact conductor 104 of the antenna and an earth contact conductor 105 of the antenna, respectively, by a bump 136. Each member that is mounted on the semiconductor chip 1 is positioned by a marker.

The relationships of the planar area size between the electric contacts 102 and 104 and between the electric contacts 103 and 105 are same as ones in the embodiment of FIG. 1. Underneath the earth contact conductor 105 is a dielectric sheet 140.

The electric contacts 104 and 105 of the antenna do not outreach the plane of the electric contacts 102 and 103 of the semiconductor chip. Consequently, it becomes possible to suppress variations in capacity due to the alignment error at the time of coupling between the antenna and the semiconductor chip.

In general, earth contact electrodes have a larger area than electrodes for hot contact, so they require a greater amount of bump. In accordance with this embodiment, a conventional semiconductor fabrication process can be used to electrically couple the antenna to the circuits in the semiconductor chip, and to suppress variations in the overlapped portions of the draw-out electrodes 104 and 105 of the antenna with the circuits formed inside the semiconductor chip. Therefore, an efficient transmission of electromagnetic energy from the antenna to the circuits inside the semiconductor chip can be achieved by means of low-cost mass production based on the conventional semiconductor fabrication process.

Embodiment 10

Figure 14:
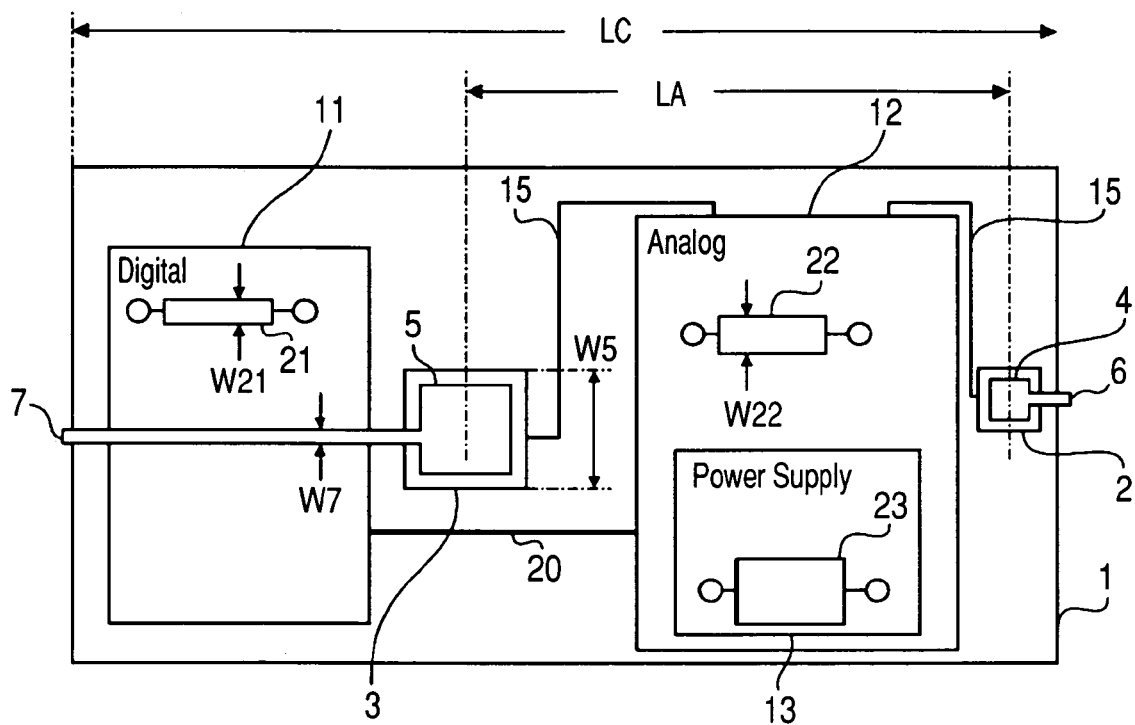
FIG. 14 is a plan view showing the configuration of an RFID tag in accordance with yet another embodiment of the present invention.

Yet another embodiment of the present invention will now be explained with reference to FIG. 14. FIG. 14 is a plan view showing the configuration of an RFID tag in accordance with yet another embodiment of the present invention. This embodiment differs from the embodiment in FIG. 12 in that electric contacts 3 and 5 which are connected to the earth potential are formed in the middle of a digital circuit 11 and an analog circuit 12, and, in terms of the planar shape, an earth draw-out conductor 7 of an antenna has a facing portion (or overlapped portion) against (or with) the digital circuit 11. Preferably, the width W7 of the earth draw-out conductor of the antenna is about 1/10 or less than the width W5 of the earth contact electrode 5.

The length LC of the semiconductor chip 1 in the X direction is same as in the embodiment of FIG. 12, yet if it is difficult to secure sufficient spacing between the earth contact electrode 5 of the antenna and the electrode 4 for hot contact of the antenna under a given configuration or design of the antenna, the spacing LA can be made shorter as in this embodiment. For example, while semiconductor chips, particularly digital circuits, are getting larger to meet high performance requirements nowadays, the spacing between the earth contact electrode 5 of the antenna and the electrode 4 for hot contact of the antenna is expected to stay about the same. Fortunately, such a demand can be satisfied by arranging the electric contact 5 in the middle of the digital circuit 11 and the analog circuit 12.

In doing so, the effects of the embodiment in FIG. 12 may be reduced, but because the width W21 of a line 21 as a circuit wire element is narrower than the width W22 of a transmission line 22 of another circuit (i.e., the analog circuit 12), the draw-out conductor (Width W7) can suppress an unnecessary capacity component that might have been newly produced. Moreover, influences of an unnecessary frequency component produced by the digital circuit 11 may be reduced since the earth draw-out conductor 7 of the antenna is connected to the most stable potential in the semiconductor chip.

Embodiment 11

Figure 15A:
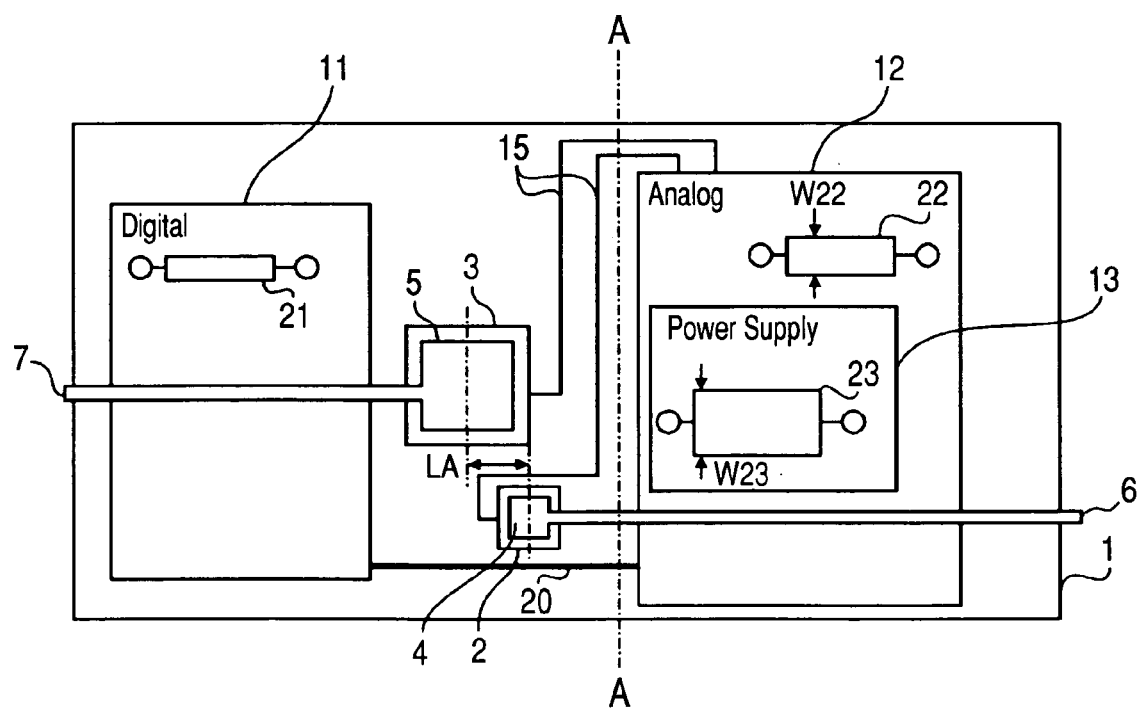
FIG. 15A is a plan view showing the configuration of an RFID tag in accordance with yet another embodiment of the present invention.
Figure 15B:
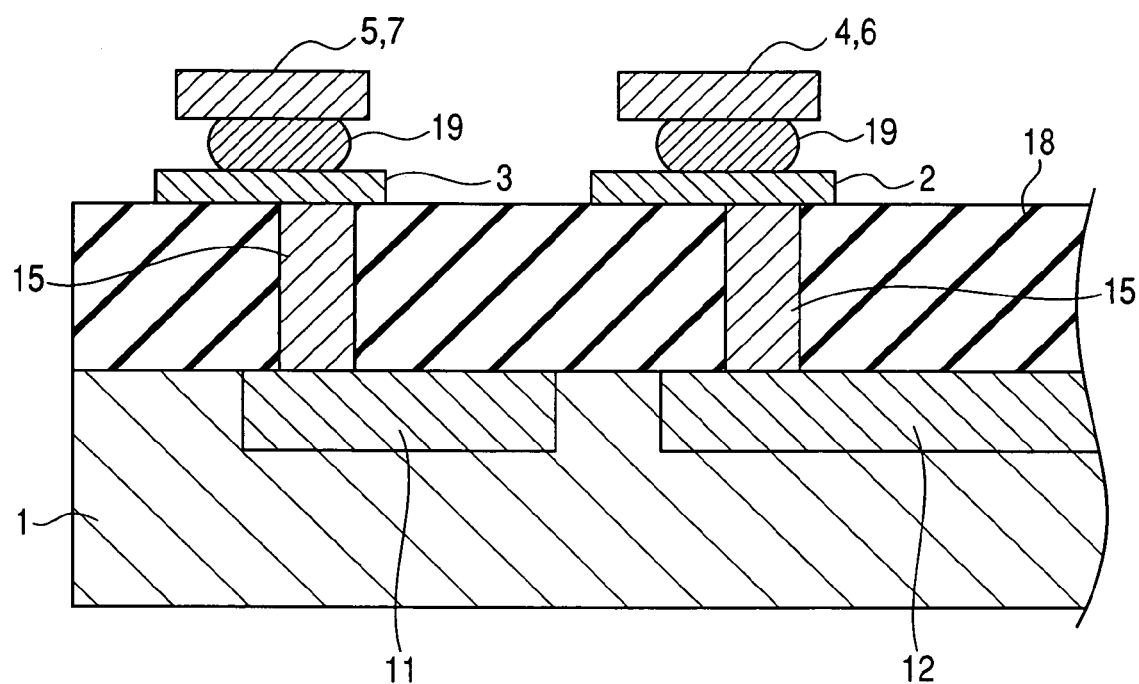
FIG. 15B is a vertical cross-sectional view showing the configuration of the RFID tag in FIG. 15A.
Figure 15C:
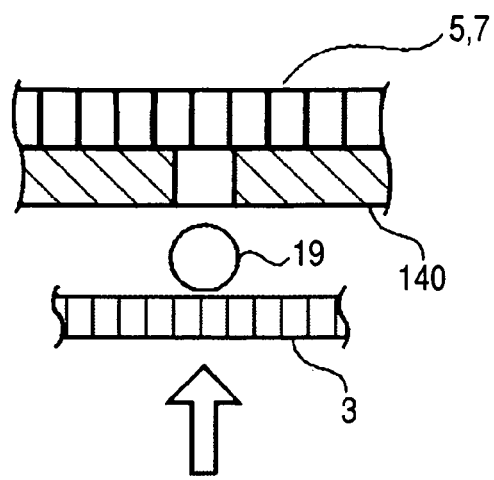
FIG. 15C diagrammatically shows a manufacturing method of the RFID tag in FIG. 15A.

Yet another embodiment of the present invention will now be explained with reference to FIG. 15 (FIGS. 15A, 15B, and 15C). FIG. 15A is a plan view showing the configuration of an RFID tag in accordance with yet another embodiment of the present invention, FIG. 15B is a vertical cross-sectional view showing the configuration of the RFID tag in FIG. 15A, and FIG. 15C diagrammatically shows part of a manufacturing method of the RFID tag in FIG. 15A. As shown in FIG. 15C, a bump 19 is squeezed into a hole of a dielectric sheet 140 on the side of an antenna for connection.

This embodiment differs from the embodiment in FIG. 14 in three aspects. Firstly, electric contacts 2 and 4 for hot contact and electric contacts 3 and 5 for earth contact are installed in the middle of a digital circuit 11 and an analog circuit 12. Secondly, in terms of the planar shape, an earth draw-out conductor 7 of an antenna has a facing portion (or overlapped portion) against (or with) the digital circuit 11. And thirdly, a hot draw-out conductor 6 of the antenna has a facing portion against the analog circuit 12 at a position in the absence of a power supply circuit 13 (see FIG. 15A).

For example, the configuration suggested in this embodiment becomes useful especially when spacing LA between the earth contact electrode 5 of the antenna and the electrode 4 for hot contact of the antenna needs to be even smaller for the demand for design of the antenna, as compared to the worldwide trend in the development of large size semiconductor chips with high performances or large circuits in result of the use of a differential amplification circuit for the analog circuit 12.

In doing so, the effects of the embodiment in FIG. 14 may be reduced, but because the width W22 of a line 22 as a circuit wire element of the analog circuit 12 is narrower than the width W23 of a transmission line 23 of another circuit (i.e., a power supply circuit 13) of the analog circuit 12, the draw-out conductor 6 can suppress an unnecessary capacity component that might have been newly produced. Moreover, similar to the embodiment in FIG. 14, influences of an unnecessary frequency component produced by the digital circuit 11 may be reduced.

Embodiment 12

Figure 16:
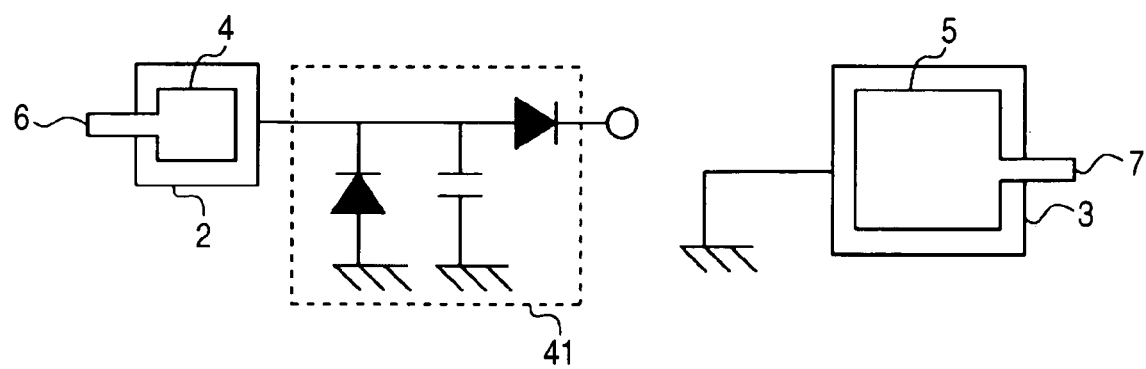
FIG. 16 is a circuit diagram showing the configuration of an RFID tag in accordance with yet another embodiment of the present invention.

Yet another embodiment of the present invention will now be explained with reference to FIG. 16. FIG. 16 is a circuit diagram showing the configuration of an RFID tag in accordance with yet another embodiment of the present invention. The same relationship as in the embodiment of FIG. 1 is found between electric contacts on the side of both the RFID chip and the antenna. Namely, electrodes 3 and 5 connected to the earth potential are all larger in size than electrodes 2 and 4 for hot contact. Meanwhile, this embodiment differs from the embodiment in FIG. 1 in that the electrode 2 for hot contact of the semiconductor chip is connected to a hot side of a half-wave rectifying circuit 41 that constitutes the circuit part of the semiconductor chip.

The half-wave rectifying circuit 41 is a unbalanced circuit, so the earth side is connected to the larger earth contact electrode 3 of the semiconductor chip and the larger earth contact electrode 5 of the antenna, while the hot side is connected to the smaller electrode 2 for hot contact of the semiconductor chip and the electrode 4 for hot contact of the antenna.

By employing a unbalanced type antenna, this embodiment benefits from characteristics of unbalanced circuits, that is, the antenna and the rectifying circuit can be connected while maintaining a high power density state on the hot side. Thus, electromagnetic energy the antenna has secured is converted into DC more efficiently.

Embodiment 13

Figure 17:
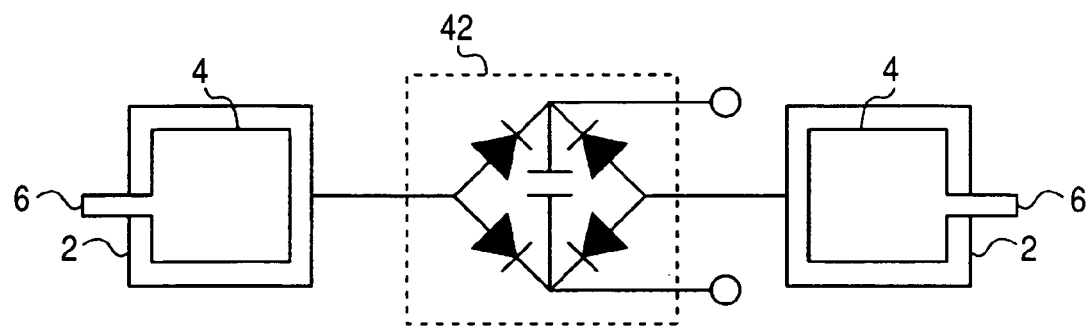
FIG. 17 is a circuit diagram showing the configuration of an RFID tag in accordance with yet another embodiment of the present invention.

Yet another embodiment of the present invention will now be explained with reference to FIG. 17. FIG. 17 is a circuit diagram showing the configuration of an RFID tag in accordance with yet another embodiment of the present invention. Similar to the embodiment in FIG. 8, a pair of electric contacts 2 and 4 on both sides has substantially same size. Meanwhile, this embodiment differs from the embodiment in FIG. 8 in that an antenna is a balanced type, two electric contacts 2 and 2 on both sides of an RFID chip have substantially same size, and a balanced circuit is connected to those electric contacts. That is to say, a full-wave rectifying circuit 42 is connected to those two electrodes for hot contact 2 of the semiconductor chip.

Since the full-wave rectifying circuit 42 is a balanced circuit, a balanced type antenna is also employed. In doing so, the antenna and the rectifying circuit are electrically coupled in a balanced state through the antenna's two electric contacts 4 (electrodes for hot contact on the side of the antenna) of same size and the semiconductor chip's two electric contacts 2 (electrodes for hot contact on the side of the chip), so electromagnetic energy the antenna has secured is converted into DC more efficiently.

Embodiment 14

Figure 18:
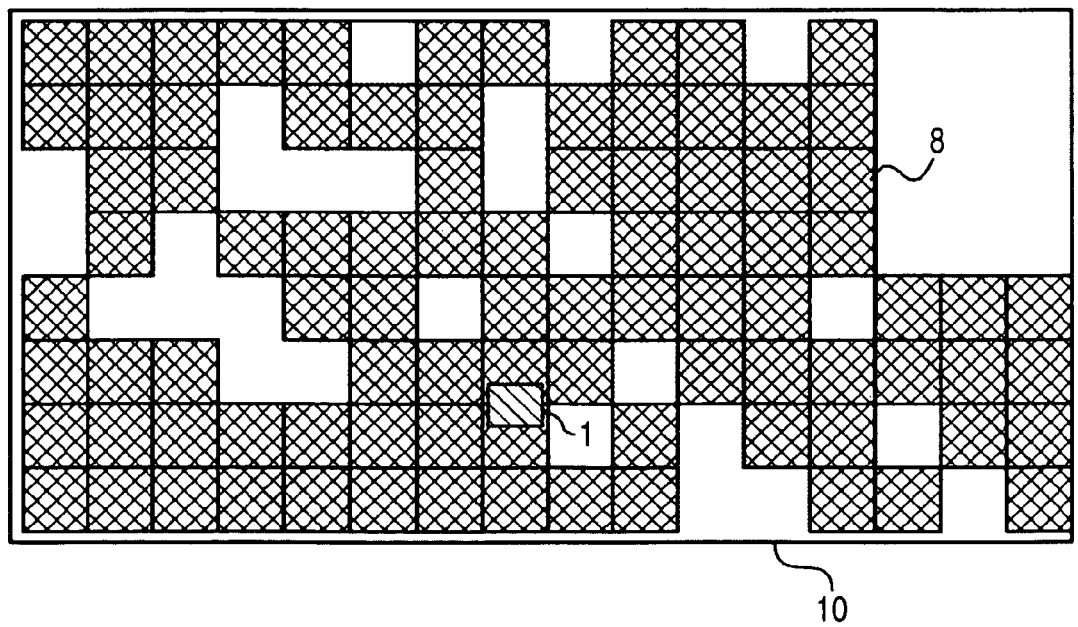
FIG. 18 shows the configuration of an antenna for an RFID tag, in accordance with one embodiment of the present invention.

Yet another embodiment of the present invention will now be explained with reference to FIG. 18. FIG. 18 diagrammatically shows the configuration of an RFID tag in accordance with yet another embodiment of the present invention. In this embodiment, an RFID tag is constituted by a plurality of planar conductor groups formed on a single piece of a dielectric sheet 10, on which an external antenna is configured with a plurality of conductors on the same plane, and on which connecting conductors and strip conductors for coupling an RFID chip 1 to high-density radio frequency circuits mounted thereon are formed.

To be short, according to this embodiment, a semiconductor chip 1 discussed in any of the embodiments described earlier is electrically connected, by the connecting scheme shown in FIG. 13, to the planar shape antenna pattern 8 formed on the dielectric sheet 10. As evident from the embodiment in FIG. 13, the planar shape antenna pattern 8 needs to be unbalanced at an electrical coupling point with the semiconductor chip, and such a pattern can be found by an exhaustive search.

The antenna pattern 8 of this embodiment does not have a so-called floating island structure, so the dielectric sheet 10 can be removed. In the case the dielectric sheet 10 is available an etching process is used to obtain the target antenna, while in the case the dielectric sheet 10 is not available a punching process is used to obtain the target antenna. Either way, it becomes possible to mass produce antennas which can achieve efficient transmission of electromagnetic energy therefrom to circuits in the semiconductor chip at low manufacturing costs.

Embodiment 15

Figure 19:
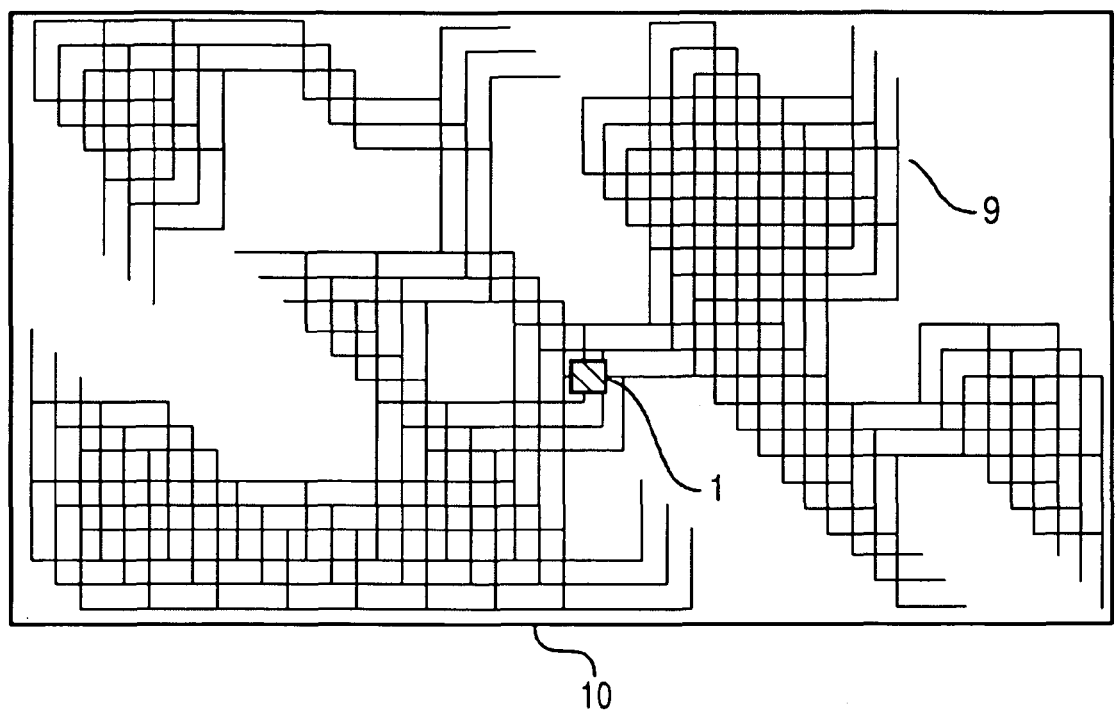
FIG. 19 shows the configuration of an antenna for an RFID tag, in accordance with another embodiment of the present invention.

Yet another embodiment of the present invention will now be explained with reference to FIG. 19. FIG. 19 diagrammatically shows the configuration of an RFID tag in accordance with yet another embodiment of the present invention. In this embodiment, a semiconductor chip 1 discussed in any of the embodiments described earlier is electrically connected, by the connecting scheme shown in FIG. 13, to a planar shape antenna pattern 8 formed on a dielectric sheet 10. The RFID tag of this embodiment is configured in a manner that the dielectric sheet 10 sufficiently transmits visible rays and that narrow, and that strip conductor groups formed on this dielectric sheet are arranged at sufficiently large spacing between them, sufficiently transmit visible rays, and present a visually-recognizable meaningful pattern through the dielectric sheet.

This embodiment differs from the embodiment in FIG. 18 in that the antenna pattern is not constituted by planar conductor elements, but by linear conductor elements 9. By arranging those linear conductors 9 in high density, the same radio frequency characteristics as in the planar conductor elements can be achieved. For instance, linear conductors made out of aluminum having a thickness of 10 micrometers and a width of 100 micrometers may be arranged at a line interval of 1 mm, and get the same antenna properties at 1 GHz as of the planar conductors having the same thickness.

In accordance with this embodiment, visible rays can pass through the linear conductor elements, so the visualization of symbols is possible through the antenna. Thus, if an RFID tag is attached to an object, the object's own symbol can be recognized. In other words, users may feel less uncomfortable or less disadvantageous visually at the attachment of an RFID tag to an object.

What is claimed is:
1. An RFID tag, comprising:
an RFID chip; and
an external antenna,
wherein the external antenna includes a pair of electric contacts and a draw-out conductor for each of the electric contacts,
wherein the RFID chip includes a pair of electric contacts,
wherein a planar shape of each of the electric contacts of the external antenna is encompassed by the planar shape of each of the electric contacts of the RFID chip, and
wherein, with respect to a direction orthogonal to draw-out directions of the draw-out conductors of the antenna, widths of the draw-out conductors are smaller than sizes of the electric contacts of the antenna.

2. The RFID tag according to claim 1,
wherein the draw-out directions of the draw-out conductor pair of the antenna are opposite from each other.

3. The RFID tag according to claim 1,
wherein the planar shape of the electric contacts of the RFID chip and the planar shape of the corresponding electric contacts of the external antenna are similar to each other.

4. The RFID tag according to claim 1,
wherein the planar shape of each of the electric contacts is polygonal, and
wherein the electric contacts on the side of the RFID chip and the electric contacts on the side of the antenna are connected by a bump structure.

5. The RFID tag according to claim 1,
wherein the antenna is a balanced type, and
wherein two electric contacts on the side of the RFID chip have the substantially same size and are connected to a balanced circuit.

6. The RFID tag according to claim 5,
wherein the balanced circuit is a full-wave rectifying circuit of bridge type.

7. The RFID tag according to claim 1,
wherein the RFID chip includes a first electric contact that is connected to earth potential of the chip and a second electric contact that is not connected to the earth potential, and
wherein, in regard to the planar shape, an area of the first electric contact is larger than an area of the second electric contact.

8. The RFID tag according to claim 1,
wherein the antenna is a unbalanced type,
wherein, among the electric contacts on the side of the RFID and the antenna, the electric contact on earth side is larger in size than the electric contact of hot side, and
wherein two electric contacts on the side of the RFID chip are connected to a half-wave rectifying circuit.

9. An RFID tag, comprising:
an RFID chip; and
an external antenna,
wherein the RFID chip includes an analog circuit, a digital circuit, a first electric contact that is connected to earth potential of the RFID chip, and a second electric contact that is not connected to the earth potential,
wherein the external antenna includes a pair of electric contacts in correspondence to the electric contacts of the RFID chip, and a draw-out conductor for each of the electric contacts,
wherein, with respect to a direction orthogonal to draw-out directions of the draw-out conductors of the antenna, widths of the draw-out conductor are smaller than sizes of the electric contacts of the external antenna, and
wherein, with respect to a plane normal to a planar shape of the electric contacts of the RFID chip, the draw-out conductor of the external antenna that is connected to the first electric contact is formed opposite to the digital circuit.

10. The RFID tag according to claim 9,
wherein, with respect to a plane normal to a planar shape of the electric contacts of the RFID chip, the draw-out conductor of the external antenna that is connected to the second electric contact is formed opposite to the analog circuit.

11. The RFID tag according to claim 10,
wherein the analog circuit includes a power supply circuit, and
wherein, with respect to a plane normal to the planar shape, the draw-out conductor of the external antenna that is connected to the second electric contact is not formed opposite to the analog circuit.

12. The RFID tag according to claim 11,
wherein a width in a direction orthogonal to the draw-out direction of a line of circuit of the power supply circuit is broader than a width of a line of circuit of the analog circuit.

13. The RFID tag according to claim 11,
wherein, with respect to a planar shape of the first electric contact and the second electric contact, the RFID chip is arranged between the analog circuit and the digital circuit.

14. The RFID tag according to claim 10,
wherein a width in a direction orthogonal to the draw-out direction of a line of circuit of the digital circuit is narrower than a width of a line of circuit of the analog circuit.

15. An RFID tag, comprising:
an RFID chip; and
an external antenna,
wherein the RFID chip includes an analog circuit, a digital circuit, a first electric contact that is connected to earth potential of the RFID chip, and a second electric contact that is not connected to the earth potential,
wherein the external antenna includes a pair of electric contacts in correspondence to the electric contacts of the RFID chip, and a draw-out conductor for each of the electric contacts,
wherein, with respect to a direction orthogonal to draw-out directions of the draw-out conductors of the antenna, widths of the draw-out conductors are smaller than sizes of the electric contacts of the external antenna, and
wherein the digital circuit is arranged in the vicinity of the first electric contact that is connected to earth potential of the RFID chip.

16. The RFID tag according to claim 15,
wherein the analog circuit is arranged in the vicinity of the second electric contact that is not connected to the earth potential of the RFID chip.

17. The RFID tag according to claim 16,
wherein the power supply circuit is arranged in the vicinity of the second electric contact that is not connected to the earth potential of the RFID chip.

18. The RFID tag according to claim 17,
wherein, with respect to a planar shape of the first electric contact and the second electric contact, the RFID chip is arranged between the analog circuit and the digital circuit.

19. The RFID tag according to claim 15,
wherein the external antenna is constituted of a plurality of conductors formed on one plane, and
wherein a connecting conductor and a strip conductor, which are used for coupling the RFID chip, the analog circuit, and the digital circuit, are formed on the plane.

20. The RFID tag according to claim 19,
wherein the connecting conductor and the strip conductor, which are used for coupling the RFID chip, the analog circuit, and the digital circuit, include a group of planar conductors formed on one layer of a dielectric sheet.

* * * * *